United States Patent [19]
Miller et al.

[11] Patent Number: 5,987,031
[45] Date of Patent: Nov. 16, 1999

[54] METHOD FOR FAIR DYNAMIC SCHEDULING OF AVAILABLE BANDWIDTH RATE (ABR) SERVICE UNDER ASYNCHRONOUS TRANSFER MODE (ATM)

[75] Inventors: Michael J. Miller, Saratoga; Vladan Djakovic, San Jose, both of Calif.

[73] Assignee: Integrated Device Technology, Inc., Santa Clara, Calif.

[21] Appl. No.: 08/862,125

[22] Filed: May 22, 1997

[51] Int. Cl.$^6$ ...................................................... H04L 12/28
[52] U.S. Cl. .......................... 370/412; 370/395; 370/468
[58] Field of Search .................................... 370/395, 412, 370/414, 417, 418, 419, 468

[56] References Cited

U.S. PATENT DOCUMENTS

| | | | |
|---|---|---|---|
| 5,533,020 | 7/1996 | Byrn et al. ................................ | 370/395 |
| 5,675,576 | 10/1997 | Kalampoukas et al. .................. | 370/395 |
| 5,706,288 | 1/1998 | Radhakrishnan et al. ............... | 370/418 |
| 5,712,851 | 1/1998 | Nguyen et al. ........................... | 370/418 |
| 5,748,614 | 5/1998 | Wallmeier ................................. | 370/395 |
| 5,751,709 | 5/1998 | Rathnavelu .............................. | 370/403 |
| 5,889,779 | 3/1999 | Lincoln .................................... | 370/395 |

*Primary Examiner*—Chi H. Pham
*Assistant Examiner*—Frank Duong
*Attorney, Agent, or Firm*—Skjerven, Morrill, MacPherson, Franklin & Friel

[57] ABSTRACT

A method for dynamic scheduling of data transmission for a large number of data channels under the available bit rate (ABR) service protocols of asynchronous transfer mode (ATM) uses a schedule table and ready queue. In this method, at each time slot, data channels referenced in the current entry of the schedule table is removed from the schedule table and appended to the ready queue. At each available transmission time slot, an ATM cell is transmitted from the data channel referenced in the record at the head of the ready queue. The data channel is then rescheduled for in the schedule table for the next transmission. The present invention also accommodates data transmission rates related to fractional time slot intervals.

12 Claims, 9 Drawing Sheets

| Interval | Kilobits/Second | Cells/Second |
|---|---|---|
| 1.0000 | 155,000.00 | 365,566.04 |
| 1.0417 | 148,795.24 | 350,932.17 |
| 1.0851 | 142,838.86 | 336,884.10 |
| 1.1304 | 137,120.92 | 323,398.39 |
| 1.1775 | 131,631.87 | 310,452.52 |
| 1.2266 | 126,362.55 | 298,024.88 |
| 1.2778 | 121,304.17 | 286,094.73 |
| 1.3311 | 116,448.27 | 274,642.15 |
| 1.3866 | 111,786.76 | 263,648.03 |
| 1.4444 | 107,311.86 | 253,094.01 |
| 1.5046 | 103,016.09 | 242,962.47 |
| 1.5674 | 98,892.28 | 233,236.51 |
| 1.6327 | 94,933.55 | 223,899.89 |
| 1.7008 | 91,133.29 | 214,937.01 |
| 1.7717 | 87,485.16 | 206,332.93 |
| 1.8456 | 83,983.07 | 198,073.27 |
| 1.9226 | 80,621.17 | 190,144.26 |
| 2.0027 | 77,393.84 | 182,532.65 |
| 2.0863 | 74,295.71 | 175,225.73 |
| 2.1733 | 71,321.60 | 168,211.32 |
| 2.2639 | 68,466.55 | 161,477.70 |
| 2.3583 | 65,725.78 | 155,013.63 |
| 2.4566 | 63,094.73 | 148,808.33 |
| 2.5591 | 60,569.00 | 142,851.42 |
| 2.6658 | 58,144.38 | 137,132.98 |
| 2.7769 | 55,816.82 | 131,643.44 |
| 2.8927 | 53,582.43 | 126,373.66 |
| 3.0134 | 51,437.49 | 121,314.83 |
| 3.1390 | 49,378.41 | 116,458.51 |
| 3.2699 | 47,401.76 | 111,796.60 |
| 3.4063 | 45,504.23 | 107,321.30 |
| 3.5483 | 43,682.66 | 103,025.15 |
| 3.6963 | 41,934.01 | 98,900.98 |
| 3.8504 | 40,255.37 | 94,941.90 |
| 4.0110 | 38,643.91 | 91,141.31 |

| | | |
|---|---|---|
| ..... | ......... | ...... |
| ..... | .... | ..... |
| 956.6819 | 162.02 | 382.12 |
| 996.5756 | 155.53 | 366.82 |
| 1,038.1328 | 149.31 | 352.14 |
| 1,081.4229 | 143.33 | 338.04 |
| 1,126.5183 | 137.59 | 324.51 |
| 1,173.4941 | 132.08 | 311.52 |
| ... | ... | ... |
| .... | ...... | .... |
| 2,350.2074 | 65.95 | 155.55 |
| 2,448.2111 | 63.31 | 149.32 |
| 2,550.3015 | 60.78 | 143.34 |
| 2,656.6490 | 58.34 | 137.60 |
| 2,767.4313 | 56.01 | 132.10 |
| 2,882.8332 | 53.77 | 126.81 |
| 3,003.0473 | 51.61 | 121.73 |
| ...... | ... | ...... |
| ...... | ...... | .... |
| 27,268.8009 | 5.68 | 13.41 |
| 28,405.9099 | 5.46 | 12.87 |
| 29,590.4363 | 5.24 | 12.35 |
| 30,824.3575 | 5.03 | 11.86 |
| 32,109.7332 | 4.83 | 11.38 |
| 33,448.7091 | 4.63 | 10.93 |

TABLE 1

METHOD FOR FAIR DYNAMIC SCHEDULING OF AVAILABLE BANDWIDTH RATE (ABR) SERVICE UNDER ASYNCHRONOUS TRANSFER MODE (ATM)

CROSS REFERENCE TO APPENDIX INCLUDING A COMPUTER PROGRAM LISTING

Appendix A, which is a part of the present disclosure, is an appendix consisting of 9 sheets of listing of a computer program and related data in one embodiment of this invention. This listing of computer programs contains material which is subject to copyright protection. The copyright owner, Integrated Device Technology, Inc., which is also the Assignee of the present patent application, has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates to communication systems using protocols under the Asynchronous Transfer Mode (ATM) standards. In particular, the present invention relates to scheduling ATM cell transmissions for multiple virtual channels under a variable bit rate service, such as available bandwidth rate (ABR) service.

2. Discussion of the Related Art

Data communication under ATM is set forth in a standard entitled "The ATM Forum Specification, version 4.0" (the "ATM standard"). Under the ATM standard, data exchange between a source system and a destination system is accomplished using one or more packetized data streams ("virtual channels"). Data and control information in each virtual channel are transported by 53-byte data packets or cells ("ATM cells"). In general, under the ATM standard, a virtual channel is set up by a virtual circuit connection under a fixed or constant bit rate service (CBR), or a variable bit rate service (VBR). In fact, under the ATM standard, many CBR and VBR virtual circuits can coexist between a given pair of source and destination systems. In one type of VBR service, known as the "available bandwidth rate service" ("ABR service"), the source and destination systems periodically negotiate for each virtual channel a bit rate according to the traffic condition in all switches along the path of the virtual channel's virtual circuit.

In an ABR virtual circuit, the virtual circuit, the source and destination systems, and all the switches in between, negotiate a "peak cell rate" (PCR), a "minimum cell rate" (MCR), and an "initial cell rate" (ICR). During the life of the virtual circuit, resource management (RM) cells are sent periodically by the source system. Initially, the ATM cells for the virtual channel are sent at the ICR until the first RM cell is sent by the source. Included in the RM cell is an "explicit rate" (ER) field and a "direction" (DIR) field, which are initialized by the source system to the PCR and the value "forward" respectively. Because of the "forward" value in the DIR field, this RM cell is referred to as the "forward RM" (FRM) cell. As the FRM cell traverses the virtual circuit towards the destination system, each switch along the virtual circuit examines the ER field of the FRM cell and, where appropriate, reduces the cell rate specified in that field to indicate the available bandwidth the switch can provide, given its own local traffic condition. If a congestion condition is experienced at the switch, i.e. the instantaneous or immediate rate at which ATM cells are arriving exceeds the rate at which these ATM cells can be processed and forwarded by the switch, a "congestion" field (CI) of the FRM cell is marked. When the FRM cell reaches the destination system, the destination system (i) makes its own adjustment to the ER field, if necessary, (ii) marks the DIR field of the RM cell to indicate that the RM cell is now a "backward" RM (BRM) cell, and (iii) returns the BRM cell to the source system in the reverse direction on the virtual circuit. When the BRM cell reaches the source system, the value in the ER field is examined against the current cell rate. The current cell rate, which is also known as the "allowable cell rate" (ACR), is increased or decreased according to the value in the ER field of the BRM cell returned.

In some applications, e.g. an ATM server, it is necessary to support a very large number of virtual channels (e.g. a 1000 channels) of various fixed and variable bit rates over a given ATM physical media. In such an application, a scheduler coordinates the shared use of the physical media among the large number of virtual channels, so that the use of the physical bandwidth of the physical media can be maximized. In addition, many schedulers provide a "fairness" scheme so that sharing of the available bandwidth among the multiple variable rate virtual channels can be carried out in a predictable manner, and each variable rate virtual channel is given some opportunity to meet its desired cell rate.

One class of fairness schemes is known as the "min-max" fairness schemes. Under a min-max fairness scheme, a system divides the virtual channels into two classes according to their respective cell rates relative to the average cell rate $$\left(\text{i.e. } \frac{\text{available bandwidth}}{\text{number of VBR virtual channels}}\right)$$

of the system. In the first class, i.e. those virtual channels having desired cell rates at or below the average cell rate, these virtual channels are provided the desired cell rate. In the second class, i.e. those virtual channels having desired cell rates above the average cell rate, these virtual channels share the remaining bandwidth. Within the second class, the bandwidth can be shared among the virtual channels equally ("unweighted"), or according to some assigned priorities ("weighted"). To ensure robustness under a min-max fairness scheme, the elements in the virtual circuits servicing the virtual channels must be capable of rapid response. Otherwise, data loss may result. For example, consider the case when one congested virtual circuit decreases its cell rate abruptly, thereby relieving the congestion condition at a previously congested element within the virtual circuit. In response to the bandwidth now available at the previous congested element, several virtual circuits may attempt to increase their respective cell rates at the same time. If the readjustment in cell rates in these virtual circuits do not occur rapidly enough, congestion conditions may then reappear at other elements of the network rapidly. Such congestion conditions, if not corrected rapidly, may lead to data loss.

To schedule a large number of virtual channels each having an independent cell rate, a number of different approaches are possible. In one approach, a large number of counters, each assigned to a separate virtual channel, can be provided. Under that approach, a count representing the number of time slots to the next transmission (i.e. the inverse of the cell rate) of the assigned virtual channel is held in such a counter, which is initialized to a predetermined value and updated once per ATM cell time slot. At the scheduled next transmission time ("time-out"), e.g. the count reaches zero, an ATM cell of the assigned virtual channel is sent and the next transmission is scheduled by resetting the counter to the predetermined value. However, the scheduling of this large number of counters is a Herculean task: at any given time, a large number of counters may time-out, so that the ATM cells of a large number of virtual channels may be delayed or skipped, due to the instantaneous congestions which may arise. Consequently, severe rate jitters can be expected in many virtual channels. Further, a counter system, such as described here, is not amenable to providing "fairness" without additional sophisticated management.

Under another approach, a schedule table is allocated in memory to provide an entry for each ATM cell time slot. Software which executes in a central processing unit (CPU) can be used to associate ATM cell time slots with virtual channels. Typically, "events" (e.g. transmission of an ATM cell) of each virtual channel occur at regular intervals according to its assigned cell rate. Such an approach has the advantages of simplicity and flexibility. Such an approach is simple because the schedule table entries are simply read in order and at regularly intervals. If a schedule table entry references a virtual channel, i.e. the virtual channel is scheduled to transmit for the current ATM cell time slot, an ATM cell is retrieved from the virtual channel and transmitted. Flexibility is achieved, for example, by providing different fairness schemes using different control programs executing in the CPU at different times to accommodate different requirements under different traffic conditions.

However, many disadvantages can be found also in the schedule table approach. For example, since the schedule table must accommodate both the highest and the lowest cell rates, and often, a large number of intermediate cell rates as well, the number of ATM cell time slots required in a schedule table can be very large. In addition, a change in cell rate for a virtual channel may result in the need to reschedule a large number of events. For a server application, for example, where many virtual channels may change cell rates simultaneously, the number of events that need to be rescheduled can become impractically large.

SUMMARY OF THE INVENTION

The present invention provides a method for scheduling data transmission for multiple data channels. The present invention is applicable to many communication systems including those using protocols under the ATM standard.

The method of the present invention maintains both a schedule table for scheduling data channels to transmit at future time slots, and a ready queue for holding references to data channel having data ready for transmission. Each entry of the schedule table can hold none, one or more records. Each record in an entry of the schedule table references a data channel having data to be transmitted at the time slot associated with the entry. At the same time, the ready queue holds zero, one or more records each referencing a data channel having data ready for transmission. In accordance with the present invention, at each time slot, the schedule table is accessed so as (i) to remove, from each entry associated with the current time slot, any and all of the records designated for transmission at the current time slot, and (ii) to include in the ready queue such removed records. By including the removed records into the ready queue, the hardware software which fetches data for data transmission is notified which data channel has data ready for transmission.

Under the method of the present invention, whenever data can be transmitted from data channels subject to scheduling by the present method, the ready queue is accessed (i) to remove a record from the ready queue[1]; and (ii) to transmit data from the data channel referenced in the removed record; (iii) to select an entry of the schedule table corresponding to a future time slot, and (iv) to include in the selected entry of said schedule table the removed record from the ready queue. Steps (iii) and (iv) above effectively reschedules the data channel for its next transmission.

1 As discussed above, each record in the ready queue represents a data channel having data ready for transmission.

Under the method of the present invention, each data channel is associated with a transmission time interval (called "ACRI", which is the multiplicative inverse of a quantity "allowable cell rate" or ACR). The transmission time interval represents the number of elapsed time slots between transmissions. In one embodiment, the present invention provides with each record in the ready queue a count representing the time slot at which the record is included in the ready queue. With the count and the ACRI, the next transmission time slot for the data channel is selected to be the time slot offset from the time slot of the last transmission by the ACRI, less the difference in elapsed time slots between the count and the time slot of the last transmission. The elapsed time between the count and the time slot of the last transmission represents the time the ready data channel waits in the ready queue ("deficit time"). By accounting for deficit time, the present invention maintains data transmission for the data channel, on the average, at a steady rate, thereby avoiding artifacts due to data rate jitter. In that embodiment, should such elapsed time exceeds ACRI, a "bottle-necked" condition, the data channel is then scheduled to transmit at the time slot immediately following. In this manner, the bottle-necked data channels maximizes their share of the available bandwidth. Thus, an inherent benefit of the method of the present invention is a min-max fairness scheme.

While the present invention can be practiced using a schedule table which allocates a single entry to each time slot, the present invention can also be practiced, with the added advantage of being able to accommodate additional data rates, using a schedule table allocating multiple entries to each time slot. By allocating in the schedule table multiple entries to a time slot, the transmission time interval can be expressed in fractions of a time slot, thereby allowing data channels to be scheduled for data transmission at a larger number of data rates. Using multiple entries for each time slot, the additional larger number of data rates are obtained without requiring the entire schedule table to be scanned at a higher rate.

Alternatively, a larger number of data rates can also be achieved by using multiple ACRIs for each data channel. In that arrangement, the ACRI to be used can be selected from the multiple ACRIs in some predetermined sequence. A "dither counter" can be used to sequence the selection. This method provides the additional larger number of data rates without requiring an increase in size of the schedule table or increasing the rate at which the entire schedule table is scanned.

In one implementation, the records in the ready queue are maintained in linked list, so that the data channels in the ready queue can be serviced in a "round robin" manner, if the records are added at one end of the linked list and removed at another.

In another embodiment, a skip count is maintained in each record of the ready queue. In that embodiment, when a record is removed from the ready queue, the skip count is updated. Transmission of data occurs when the updated skip count reaches a predetermined value (e.g. zero). This embodiment allows accommodation of very slow data rate channels, since transmission occurs only once in multiple scheduled time slots. In this manner, transmission time interval much greater than the number of time slots represented on the schedule can be accommodated without increasing the transmission table size.

The present invention is better understood upon consideration of the detailed description below and the accompanying drawings.

BRIEF DESCRIPTION OF THE DRAWINGS

FIG. 5 shows in Table 1 an example of the available data rates that can be specified in an ACR rate table in the embodiment of FIG. 4.

DETAILED DESCRIPTION OF THE PREFERRED EMBODIMENTS

Figure 1:
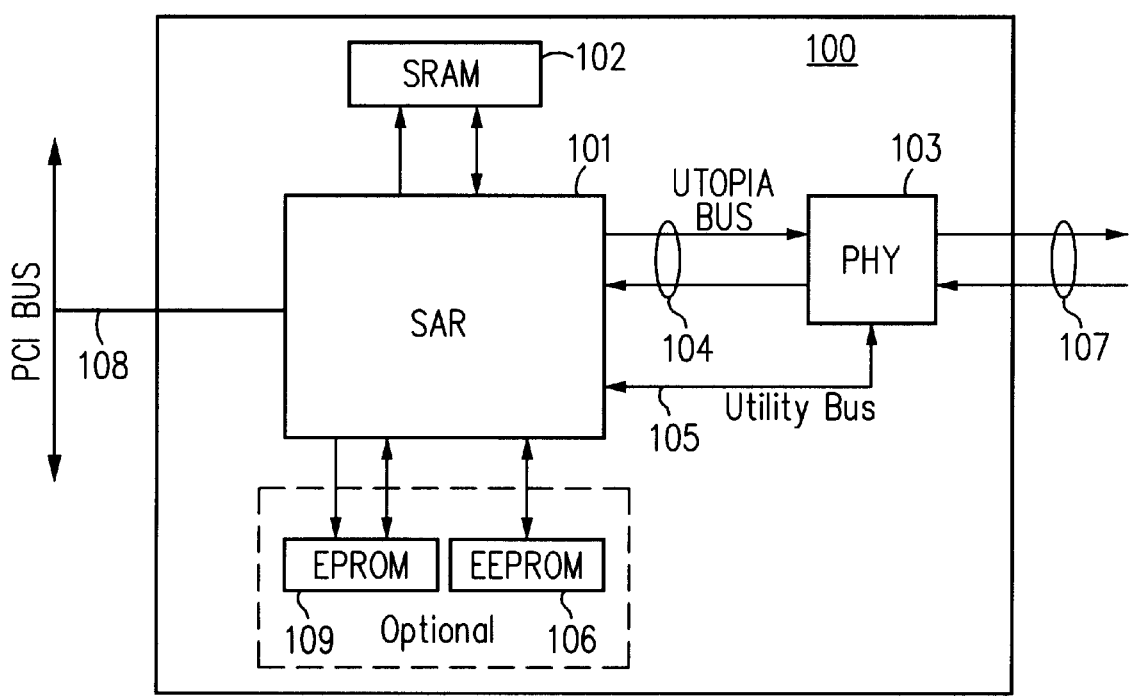
FIG. 1 shows a network interface system 100, including a segmentation and reassembly integrated circuit (SAR) 101, in which the present invention can be implemented.

The present invention can be implemented in a communication system using the ATM protocols. In particular, the present invention can be implemented in a dynamic scheduler of a segmentation and reassembly (SAR) integrated circuit. One implementation of this SAR integrated circuit supports both fixed rate and variable rate virtual channels. Such a SAR integrated circuit is shown in FIG. 1 which shows a network interface system 100 within which the present invention can be implemented. System interface system 100 interfaces with a host computer (not shown) over an industry standard PCI bus 108, and interfaces with an ATM network 107 over through a framer and physical media (PHY) device 103. System 100 includes SAR integrated circuit 101 ("SAR 101") which receives data from both the host computer and ATM network 107. SAR 101 segments the data received from the host computer into ATM cells, which are typically received in data packets ("protocol data units") in accordance with an established higher level protocol. The segmented ATM cells are provided over an industry standard UTOPIA bus 104 to PHY device 103 for transmission into ATM network 107. At the same time, SAR 101 receives ATM cells from PHY device 103, which are then reassembled by SAR 101 into the data packets of the higher level protocol for transmission to the host computer over PCI bus 108. An example of such a higher level protocol is the convergence sublayer (CS) protocol. In performing the segmentation and reassembly operations, SAR 101 uses static random access memory (SRAM) for storing such data structures as connection tables, buffer queues, segmentation channels, and scheduling tables. In addition, non-volatile memory, such as EPROM[2] 109 or EEPROM[3] 106 shown in FIG. 1, can also be provided to store the driver software necessary to drive the operations of SAR 101.

Figure 2:
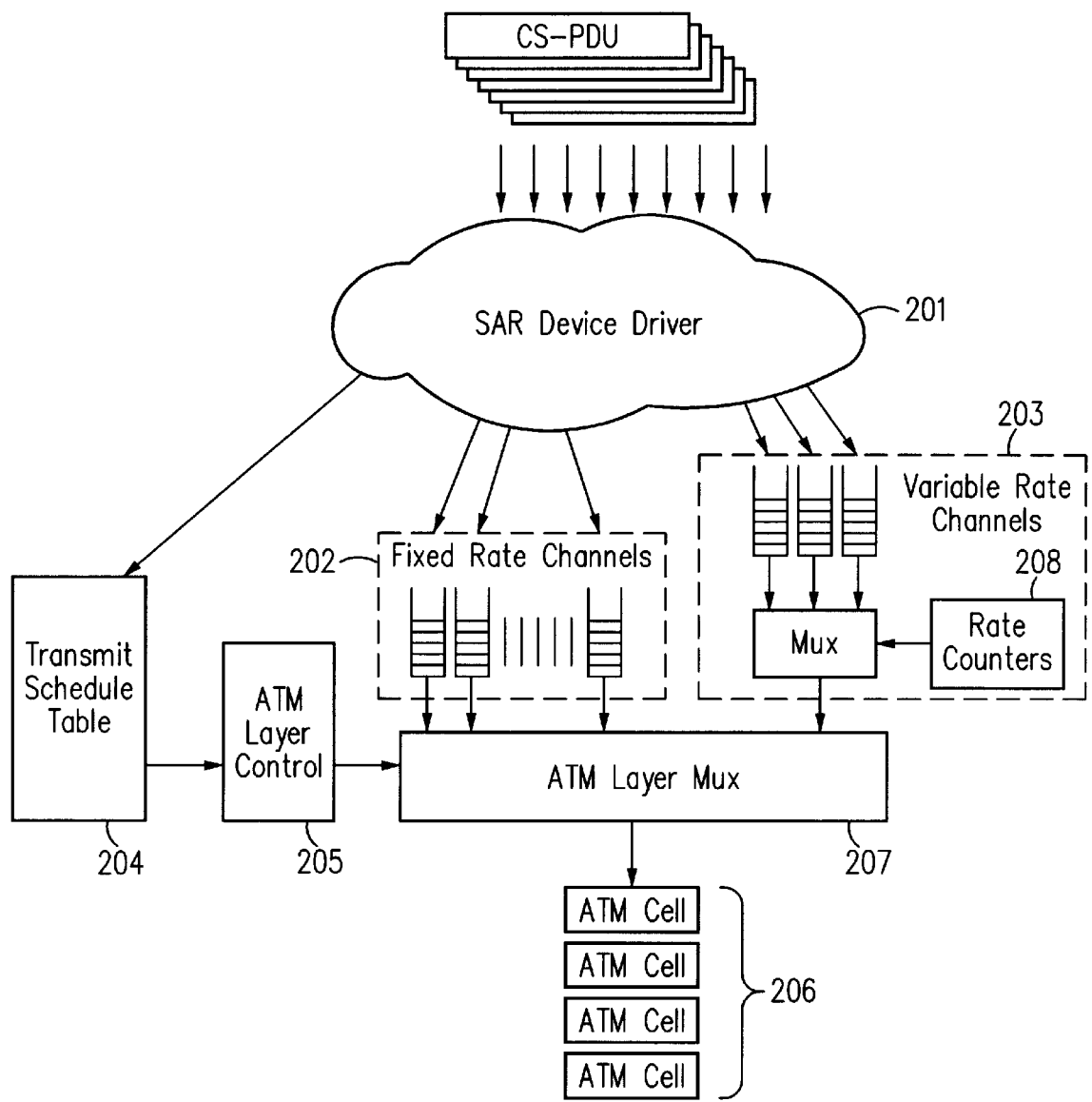
FIG. 2 illustrates schematically the transmission operations of SAR 101 in an embodiment of the present invention.

[2] Electrically programmable read-only memory
[3] Electrically erasable programmable read-only memory The transmission operations of SAR 101 is illustrated schematically in FIG. 2. As shown in FIG. 2, SAR 101 receives data from the host computer over PCI bus 108 in CS protocol data unit (CS-PDU) data packets. The operations of SAR 101 is globally controlled by a SAR device driver 201. The CS-PDU data packets are segmented into ATM cells and queued for transmission in their respective virtual channels. To emphasize that SAR 101 typically supports both fixed rate (i.e. CBR) services and variable rate (i.e. VBR or ABR) services, fixed rate virtual channels are illustrated separately as CBR channels 202, and variable rate virtual channels are illustrated as VBR/ABR channels 203 respectively. The physical bandwidth of SAR 101 is shared amongst CBR and VBR/ABR channels 202 and 203 according to the transmission schedule implemented in transmission schedule tables 204. A state machine, represented in FIG. 2 by ATM layer control module 205, controls multiplexing SAR 101's ATM cell transmission time slots 206 among CBR channels 202 and VBR/ABR channels 203. FIG. 2 shows, in particular, that the present embodiment further controls transmission of ATM cells in VBR/ABR channels 203 by including a rate control mechanism represented by rate counters 208.

Figure 3:
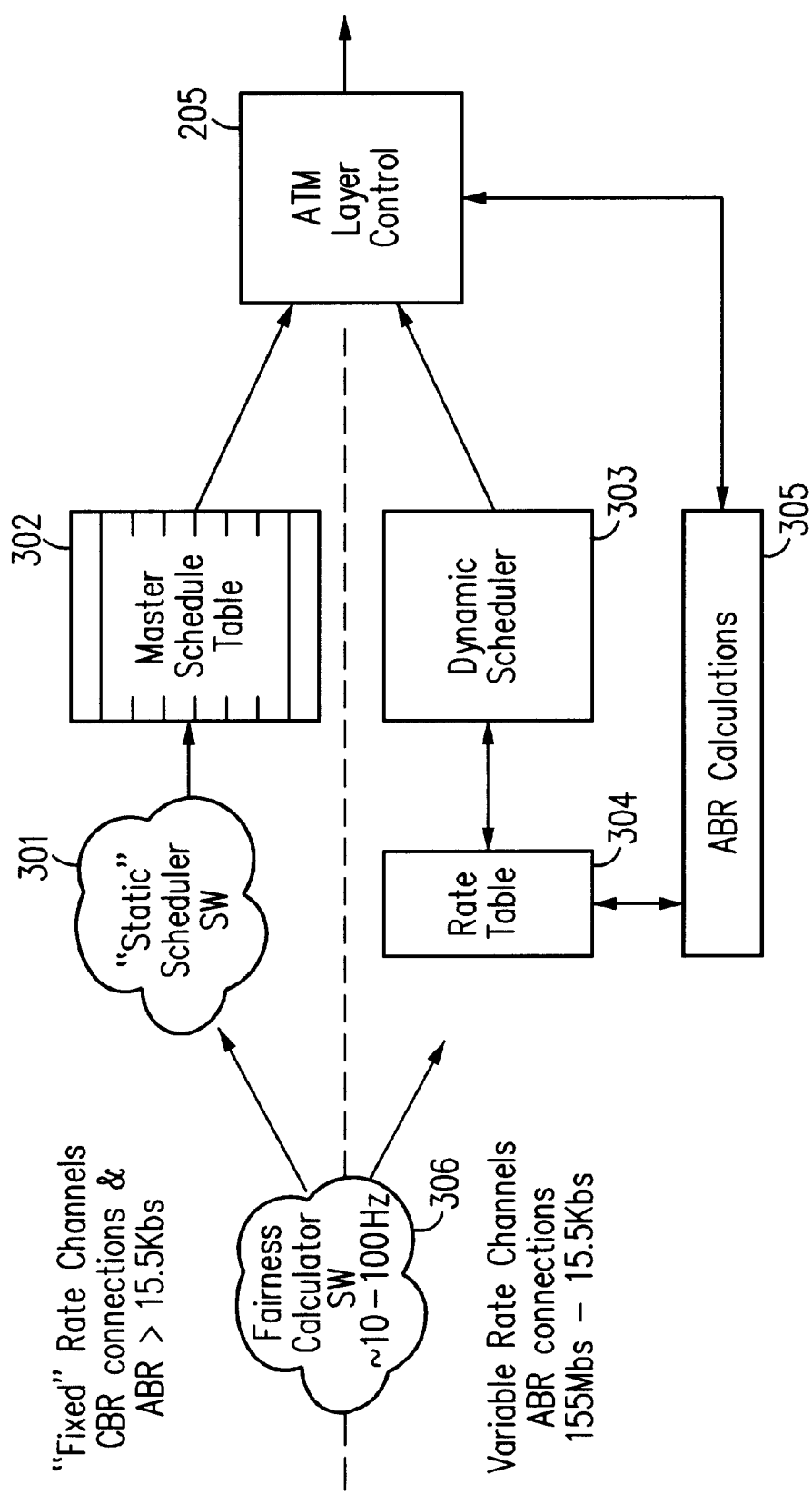
FIG. 3 illustrates the static and dynamic scheduling mechanisms used in SAR 101 for scheduling fixed rate channels and variable rate channels, respectively.

In this embodiment, scheduling is provided by a 2-level scheme, in which a static master scheduler is used for scheduling ATM cell transmissions in fixed rate channels, and a dynamic scheduler is used for scheduling transmissions in the variable rate channels. FIG. 3 illustrates in the split into static and dynamic scheduling mechanisms. As shown in FIG. 3, for fixed rate channels, a static scheduler 301 schedules transmissions for fixed rate channels at regular intervals in a master schedule table 302. Master schedule table 302 is read by ATM layer control module 205 to determine which of the packets, if any, queued at the fixed rate channels are to be transmitted into ATM network 107. In this embodiment, static scheduler 301 schedules into master schedule table 302 time slots allocated for the transmission of ATM cells from variable rate channels, or transmission of null cells from fixed rate channels. The null cells are used to maintain substantially constant bit rates for fixed rate channels. Such a static scheduler for the fixed rate channels can be implemented, for example, by the static scheduler described in copending U.S. patent application ("Static Scheduler Application"), entitled "SYSTEM AND METHOD FOR TRANSMISSION RATE CONTROL IN A SEGMENTATION AND REASSEMBLY CIRCUIT UNDER ATM PROTOCOL", by Michael J. Miller et al, Ser. No. 08/520,285, filed Aug. 25, 1995, and assigned to Integrated Device Technology, which is also the assignee of the present invention. The disclosure of the above-referenced Static Scheduler Application is hereby incorporated by reference in its entirety.

The variable rate channels are scheduled by a "dynamic scheduler" 303, which schedules the variable rate channels according to their "allowable cell rates" (ACRs). The ACR for each variable rate channel is stored in ACR rate table 304, which is modified by rate control module 305 for each variable rate channel according to traffic conditions, e.g. congestions, in the channel's associated virtual circuit. Dynamic scheduling of variable rate channels are discussed in further detail below. As explained below, dynamic scheduler 303 of the present invention inherently provides an unweighted fairness scheme which shares the available bandwidth among the variable rate channels. However, it is conceivable that an additional fairness scheme can be additionally provided to control the static and dynamic scheduling mechanisms. This additional fairness scheme, represented in FIG. 3 by fairness calculator 306, can be provided, for example, in a software driver for SAR 101. One example of such additional fairness scheme allocates a local maximum cell rate to each variable rate channel. This local maximum cell rates of all variable channels can be reallocated periodically according to the average local traffic load experienced by SAR 101 in the immediately preceding time period.

Under the ATM standard, when the virtual circuit for an ABR channel is first established, the elements in the virtual circuit negotiate an initial cell rate (ICR), a peak cell rate (PCR) and a minimum cell rate (MCR) upon set-up. Initially, the ICR is the ACR. The values of the PCR and MCR parameters constitute the maximum and the minimum acceptable cell rates during the life time of the virtual circuit. As discussed above, the ACR for each virtual channel is revised periodically by transmitting from the source end-station a resource management (RM) cell. The rate determination mechanism using an RM cell is illustrated by FIG. 4.

Figure 4:
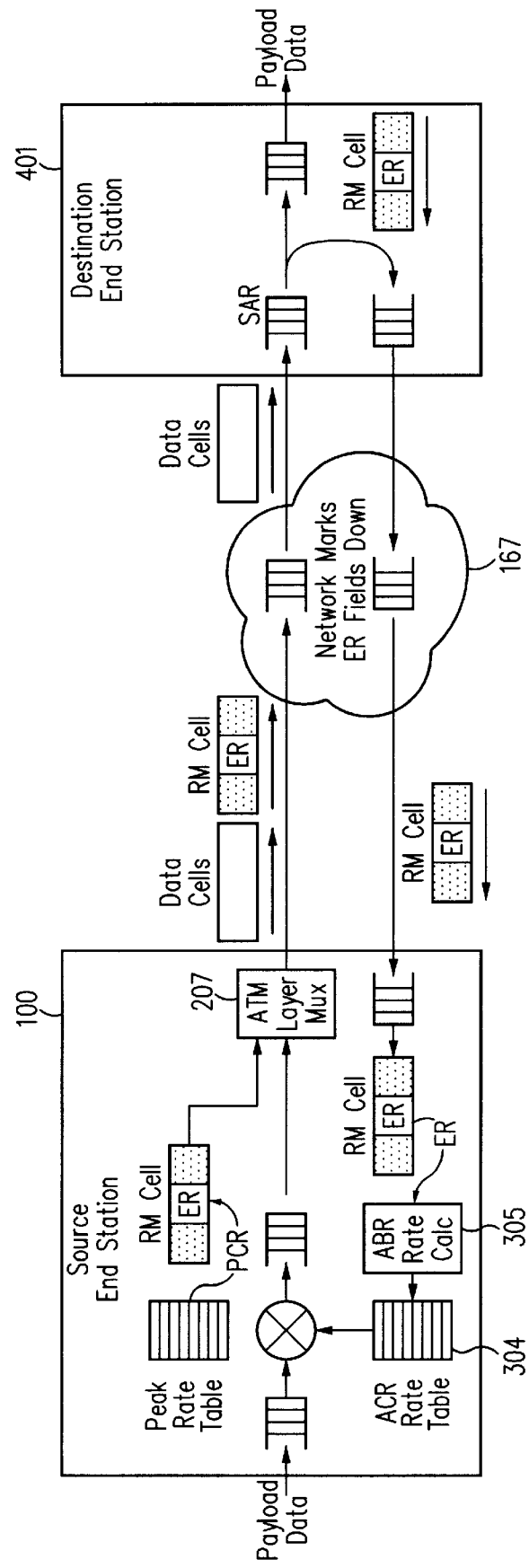
FIG. 4 shows the cell rate determination mechanism used in an embodiment of the present invention.

As shown in FIG. 4, for each variable channel, source end-station 100 transmits an RM cell periodically (e.g. every 32 data ATM cells) into the variable channel's associated virtual circuit in ATM network 107. In addition to identification information identifying the virtual channel, an RM cell includes the fields: "direction" (DIR), "congestion indicator" (CI), "no increase" (NI), "explicit cell rate" (ER), "current cell rate" (CCR) and "MCR". Source end-station 100 designates the "DIR" field of the RM cell the value "forward" (i.e. a forward RM (FRM) cell) and provides the values of the "ER", "CCR" and "MCR" fields to be the current ACR, the PCR and MCR values. As mentioned above, PCR and MCR values are negotiated at the set-up of the virtual circuit. Each element in the virtual circuit of the virtual channel can decrease, but not increase, the value of the ER field of the FRM cell according to the element's local traffic condition. Neither can the element decrease the value of the ER field below the negotiated MCR. If an element is experiencing a congestion condition, or if no increase in the CCR is desired, the element can so indicate by appropriately setting the "CI" and "NI" fields respectively. When destination end-station 401 receives the FRM cell, destination end-station 401 overwrites the "DIR" field of the FRM cell by the value "backward", thereby converting the ATM cell from an FRM cell to a "backward RM" (BRM) cell. Destination end-station 401 can also make appropriate modification to the BRM cell, if necessary, before returning the BRM cell to source end-station 100 via the associated virtual circuit in ATM network 107.

At source end-station 100, rate control module 305 examines the BRM cell received and determines if an increase or decrease in ACR is warranted. If neither the "CI" nor the "NI" field are set, i.e. indicating neither a congestion condition, nor a "no increase" constraint, ACR can be increased. ACR can be increased by a predetermined increment factor (RIF) of the PCR negotiated at virtual circuit creation time, subject to the negotiated ER returned in the BRM cell. The relationship between the new ACR ($ACR_{new}$) and the current ACR ($ACR_{old}$) is given by:

$$ACR_{new}=\min(ER, ACR_{old}+ACR_{old}*RIF)$$

Source end-station 100 can decrease ACR when one or more of the following conditions are met: (i) the "CI" field of the received BRM is set, indicating a congestion condition in one or more elements of the virtual circuit in ATM network 107; (ii) an idle virtual channel condition, or (iii) a condition in which an extreme congestion safeguard is indicated. An idle virtual channel is indicated when CCR is greater than ICR and, at the time the FRM cell is sent, a predetermined threshold time period elapsed since the last RM cell is sent. An extreme congestion safeguard is indicated when multiple FRM cells have been sent, and not returned, since the last BRM cell is received at the source end-station 100. With a congestion condition, ACR can be decreased by a predetermined reduction factor (RDF) of the last ACR, subject to the MCR negotiated at the creation of the virtual circuit. The relationship between $ACR_{new}$ and $ACR_{old}$ under a congestion condition is given by:

$$ACR_{new}=\max(MCR, ACR_{old}-ACR_{old}*RDF)$$

In the case of an idle virtual channel condition, ACR is not decreased below ICR, and $ACR_{new}$ can be calculated as a function of the $ACR_{old}$ and the elapsed time since the last FRM cell ($t_{last\_FRM}$) One relationship between $ACR_{new}$ and $ACR_{old}$ that can be used under the idle virtual channel condition is given by:

$$ACR_{new}=\max(ICR, ACR_{old}-c*ACR_{old}*t_{last\_FRM})$$

where c is a constant.

When extreme congestion safeguard is indicated, ACR can be further decreased by a second predetermined reduction factor (CDF). The relationship between $ACR_{new}'$, i.e. the ACR after adjustment for the idle virtual channel condition, and $ACR_{new}$ under extreme congestion safeguard is given by:

$$ACR'_{new}=ACR_{new}-ACR_{new}*CDF$$

In this embodiment, to minimize the size of ACR rate table 304 and to ensure that any increase or decrease in ACR is a meaningful increase or decrease, i.e. affecting the cell rate of the virtual channel in a reasonably significant manner, increase or decrease of ACR in a virtual channel is taken in logarithmic-linear steps, each representing an increase or decrease in cell rate of a predetermined percentage from the immediately previous rate. An example of the available rates that can be specified in an ACR rate table is reproduced in Table 1 of FIG. 5. Table 1 includes 256 entries and each rate can be represented by a 20-bit floating point number with 5 bits of fractional precision. Each cell rate in Table 1 differs from the immediately previous cell rate by approximately 4%. When a rate increase or a rate decrease is required, the new current cell rate can be obtained by a single table lookup into a rate increase table or a rate decrease table, using the present current cell rate.

The above rate calculation can be accomplished effectively according to a novel method disclosed in copending patent application, entitled "Transmission Rate Calculation Scheme Using Table Lookup" ("Transmission Rate Application"), by Michael J. Miller et al., filed on the same day as the present application, attorney docket number 08,862152, and assigned to Integrated Device Technology, Inc., which is also the Assignee of the present application. The Transmission Rate Application is hereby incorporated by reference in its entirety.

Figure 6:
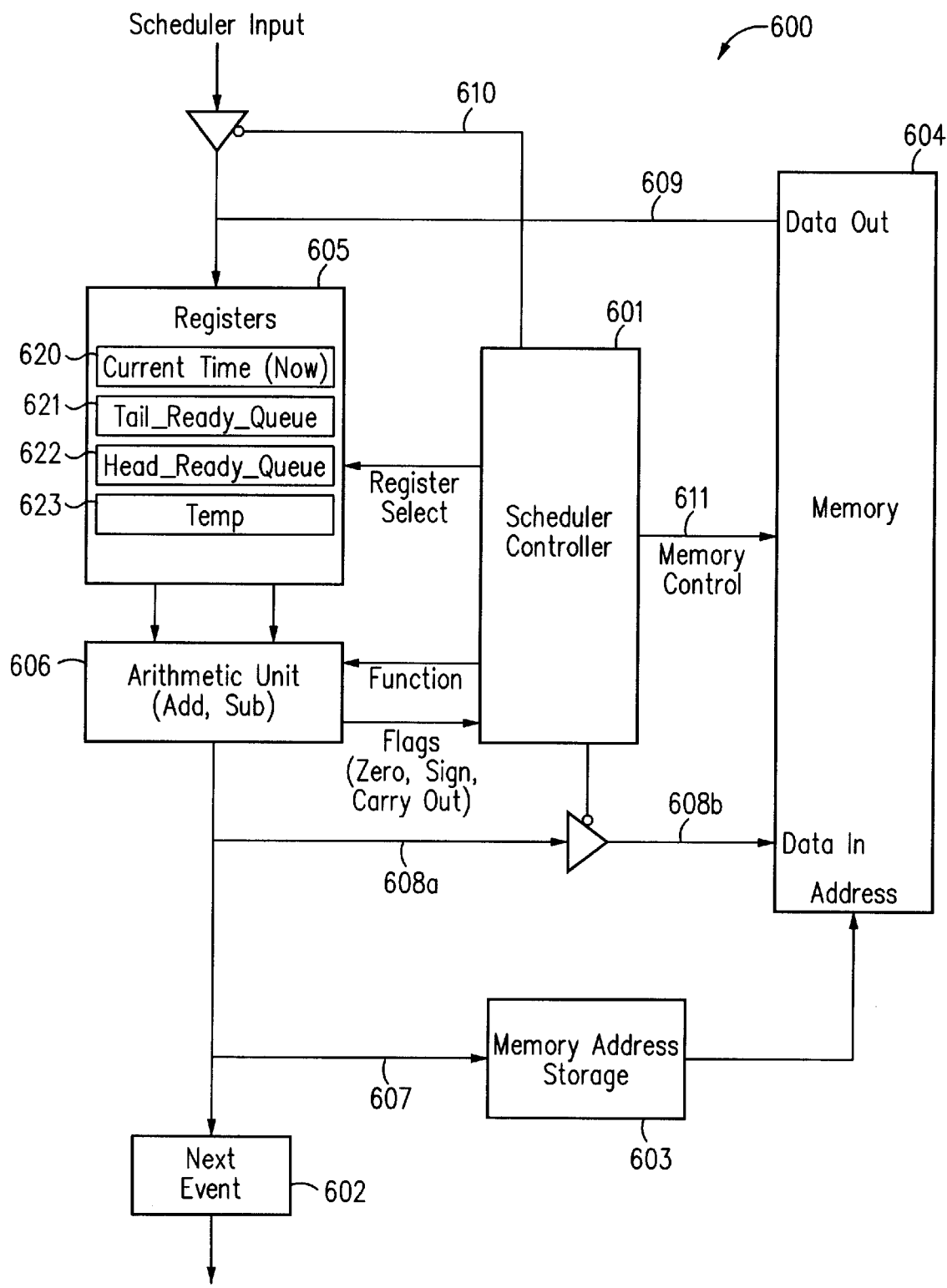
FIG. 6 shows a logic circuit 600 implementing dynamic scheduler 303 in an embodiment of the present invention.

In the present embodiment, dynamic scheduler 303 can be implemented in a logic circuit 600 shown in FIG. 6. As shown in FIG. 6, circuit 600 includes a scheduler controller 601. Scheduler controller 601 controls the operations of dynamic scheduler 303, which is described in further detail below. Dynamic scheduler 303 includes a dynamic schedule table (DST) 651 and a ready queue 650, which are both stored in a memory 604. Memory 604, which is accessed using an address specified in memory address register 603, receives data input from bus 608b and provides data output on bus 609. If desired, memory 604 can be implemented as part of SRAM 102 of FIG. 1. Memory transactions at memory 604 are controlled by scheduler controller 601 via control signal bus 611.

In the present embodiment, DST 651 holds the schedule for transmission for a fixed number of future transmission time slots. A transmission time slot represents a time period during which an ATM cell can be transmitted. In this implementation, at each transmission time slot, DST 651 has an entry ("DST entry") which points to a list of the virtual channels scheduled for transmission at that time slot ("current transmission list"). A current time register 620 in a register file 605, described below, holds a pointer pointing to the DST entry ("current DST entry") assigned to the current transmission time slot. Ready queue 650 holds a list ("ready list") of virtual channels having ATM cells scheduled for transmission at the present or an earlier time slot.

Scheduler controller 601 has access to a register file 605, which includes (i) a current time register 620; (ii) a head register 622 and a tail register 621 pointing, respectively, the first and last records of the ready list; and (iii) a temporary register 623. Dynamic scheduler 303 uses arithmetic unit 606 to perform required arithmetic operations. As shown in FIG. 6, arithmetic unit 606 receives its operands from the registers in register file 605.

Prior to the beginning of each transmission time slot, the current transmission list for the current DST entry is retrieved from DST 651 and appended to the tail of the ready list in ready queue 650. ATM layer control module 205 consults ready queue 650 for any ABR virtual channels scheduled for transmission, after a determination that none of the CBR channels, which are assigned higher priority, is scheduled to transmit at the current time slot. When an ATM cell is transmitted from the virtual channel referenced at the head of the ready list, the reference to the virtual channel is removed from the head of the ready list. The virtual channel removed from the ready list is then rescheduled for next transmission by dynamic scheduler 303. Rescheduling is accomplished by appending a reference to the virtual channel to the current transmission list of a later time slot.

Figure 7:
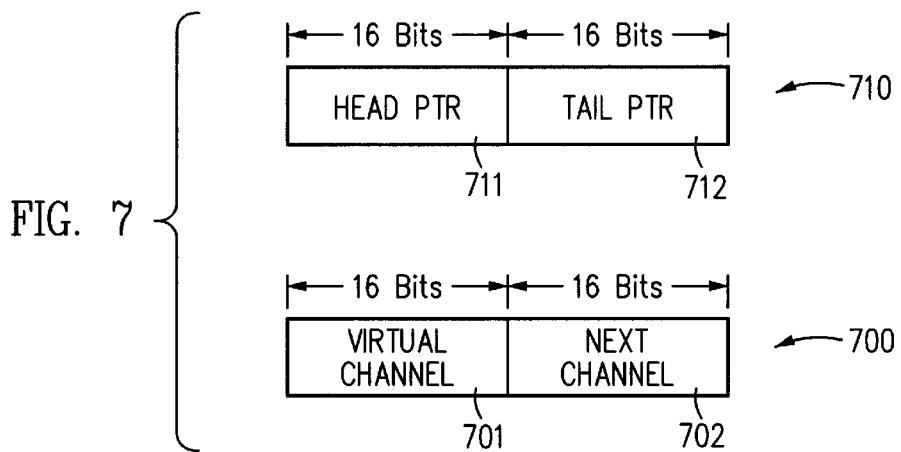
FIG. 7 shows the fields of 32-bit entry 710 in dynamic schedule table 651 and the fields of record 700 in a current transmission list associated with an entry of dynamic schedule table 651, in one embodiment of the present invention.
Figure 8:
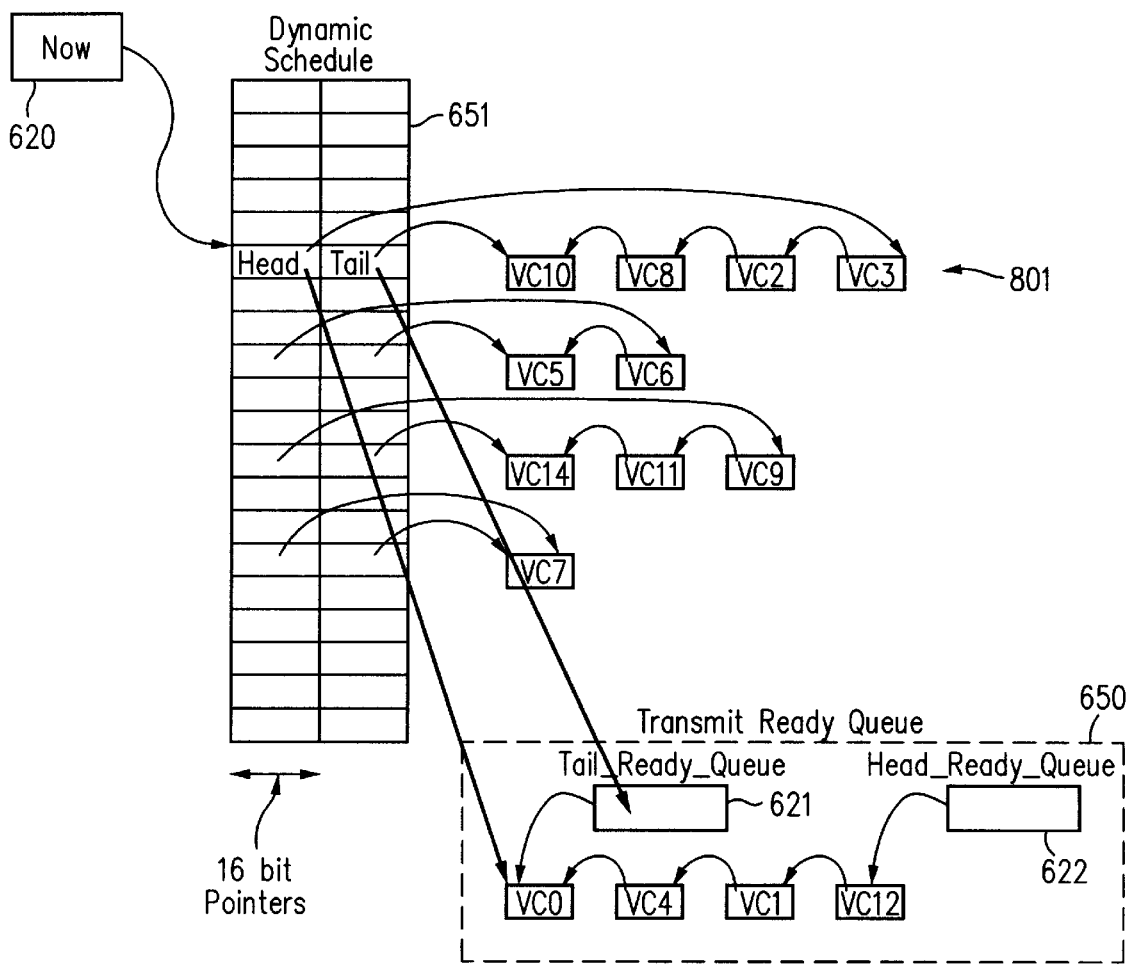
FIG. 8 shows one implementation of dynamic schedule table 651 and ready queue 650, in one embodiment of the present invention.

One implementation of DST 651 and ready queue 650 is illustrated in FIG. 8. As shown in FIG. 8, DST 651 includes an array of 32-bit words. Each DST entry of DST 651 corresponds to a transmission time slot. As explained above, current time register 620 (FIG. 6) contains a pointer ($t_{now}$) pointing to the rurrent DST entry in DST 651. Each DST entry references both the head record and the tail record of a current transmission list. For example, in FIG. 8, the current DST entry points to the head and the tail records of current transmission list 801. FIG. 7 shows a DST entry 710 of dynamic schedule table 651. As shown in FIG. 7, DST entry 710 includes a "head pointer" field 711 and a "tail pointer" field 712, whose values point, respectively, to the first and the last records of a current transmission list. In FIG. 8, the current transmission list is implemented as a linked list. For example, current transmission list 801 includes records referencing virtual channels "VC10", "VC8", "VC2" and "VC3". The format of a record in a current transmission list is illustrated by record 700 of FIG. 7. Record 700 includes a "virtual channel" field 701, holding a reference to a virtual channel that is scheduled to transmit at the current time slot, and a "next channel" field 702 pointing the next record in the current transmission list. In this embodiment, each record in the ready list of ready queue 650 is designed to have the same format as a record in the current transmission list, to simplify processing.

Prior to the beginning of ATM cell transmission time slot, the current transmission list for the current DST entry is appended to the ready list of ready queue 650. Appending the current transmission list to ready listCan be achieved efficiently by (i) saving the content of tail register 621 into temporary register 623 and (ii) copying, respectively, the values of the head pointer and tail pointer fields of the current DST entry to tail register 621 and the "next channel" field of the record pointed to by the pointer in temporary register 623 (i.e. the previous tail record of the ready list). Alternatively, if desired, the current transmission list can be inserted at the head of the ready list. In the present embodiment, the task of appending a current transmission list to the ready list of ready queue 650 can be achieved with one read access (i.e. a 32-bit read access to read both the head and tail pointer fields of the current DST entry) and one write access (i.e. writing into the head pointer field of the DST entry read, or writing into the "next channel" field of the last record in the ready list) to memory 604.

Figure 9:
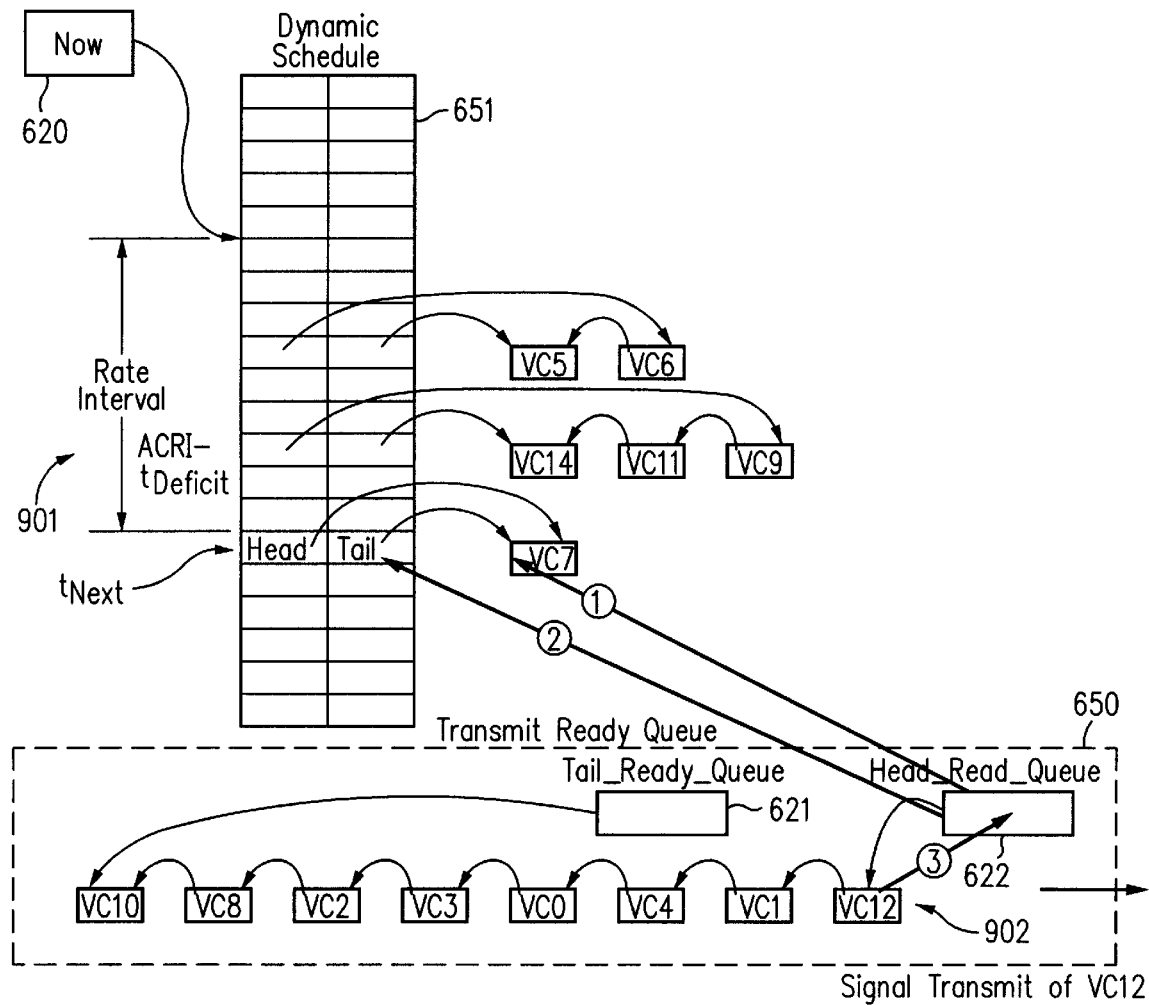
FIG. 9 illustrates an operation in dynamic schedule table 651 for scheduling a next transmission of a virtual circuit.

When an ATM cell can be transmitted from a VBR virtual channel, ATM layer control module 205 removes the reference to the virtual channel from the head of the ready list. After an ATM cell is transmitted from the virtual channel, dynamic scheduler 303 then schedules the virtual channel in an appropriate current transmission list for the virtual channel's next transmission. FIG. 9 illustrates scheduling a virtual channel for next transmission.

The time slot ($t_{next}$) for the next transmission is calculated using both the multiplicative inverse of the ACR ("ACRI") for the virtual channel and the elapsed or "deficit" time ($t_{deficit}$) between the scheduled transmission time slot for the current transmission and the actual time slot at which the current transmission is accomplished (i.e. $t_{now}$). ACRI represents the expected number of elapsed time slots between transmission. Time $t_{deficit}$ represents the duration over which the virtual channel waits for its turn for transmission in ready queue 650. Time $t_{deficit}$ can exceed the ACRI for the virtual channel, up to a predetermined maximum ($t_{max\_burst}$). If time $t_{deficit}$ is greater or equal to ACRI, a condition referred to as the "bottle-necked condition", the virtual channel is scheduled for the transmission in the next time slot (i.e. $t_{next}=t_{now}+1$), and time $t_{deficit}$ is decremented by ACRI–1 (i.e. $t_{deficit}=t_{deficit}-ACRI-1$). Thus, a bottle-necked virtual circuit is immediately returned ready queue 650. Alternatively, if time $t_{deficit}$ is less than ACRI, $t_{deficit}$ is set to zero and $t_{next}$ for the virtual channel is scheduled to be (ACRI–$t_{deficit}$) time slots from the current time slot (i.e. $t_{next}=t_{now}+ACRI-t_{deficit}$)

To perform the scheduling of a virtual channel, after time $t_{next}$ is determined, dynamic scheduler 303 appends to the current transmission list of the DST entry at time $t_{next}$ a record referencing the virtual channel. As shown in FIG. 9, the operation of appending such a record can be accomplished by (i) copying into temporary register 623 the tail pointer in the DST entry at time $t_{next}$; (ii) if the pointer copied into temporary register 623 is a null pointer, i.e. no other virtual channel has been scheduled to transmit at time $t_{next}$, the content of head register 622 is written into the head pointer field of the DST entry at time $t_{next}$; (iii) however, if the pointer copied into temporary register 623 is not a null pointer, the content of head register 622 is copied into the "next channel" field of the last record in the current transmission list of the DST entry at time $t_{next}$; and (iv) the content of the head register 622 is then copied into tail pointer field of the DST entry at $t_{next}$. Finally, the second record in the ready list is moved up to the head position by replacing the content of head register 622 by the content of the "next channel" field in the head record of the ready list. Thus, in this embodiment, rescheduling can be achieved by two read accesses (i.e. one read access to the target DST entry at the time $t_{next}$ and one read to the first record in the ready list) and two write accesses (i.e. a write access to the tail pointer of the DST entry at time $t_{next}$ and a write access to either the head pointer of the DST entry at time $t_{next}$ or to the last record of the current transmission list at time $t_{next}$) to memory 604.

Figure 10:
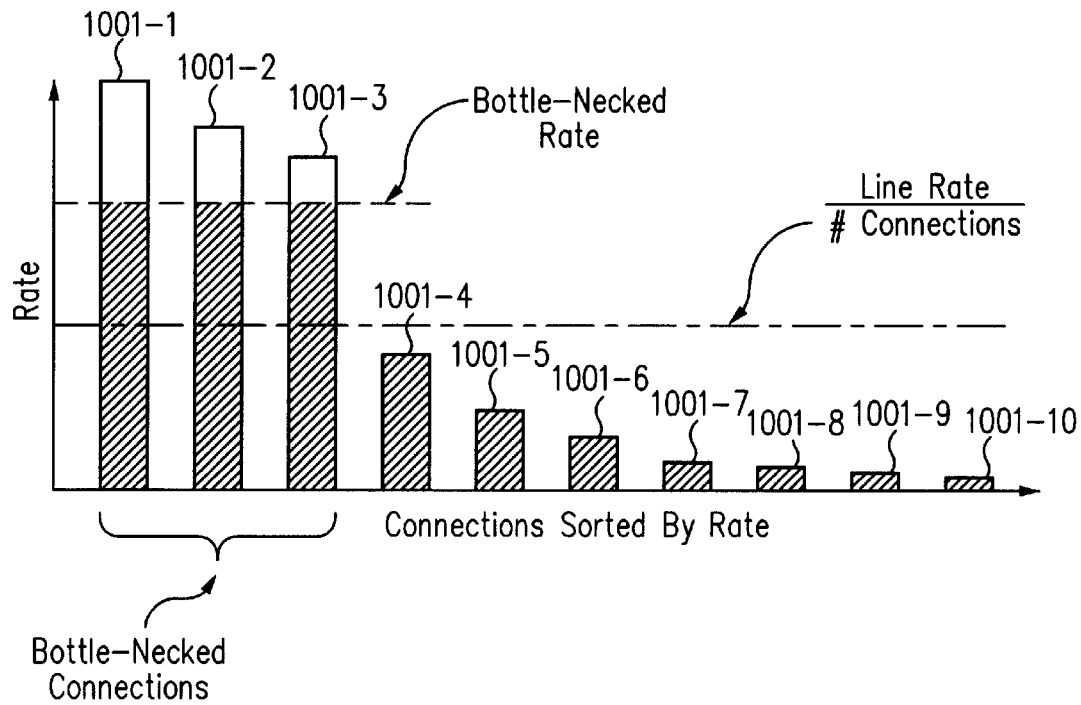
FIG. 10 illustrates the "min-max" fairness scheme for sharing available bandwidth.

It should be appreciated that dynamic scheduler 303 has a built-in "min-max" fairness scheme. This min-max fairness scheme is illustrated in FIG. 10. In FIG. 10 shows, sorted in descending cell rate order, VBR virtual channels 1001-1 to 1001-10, which share the total available bandwidth, and their respective cell rates. Under this min-max fairness scheme, dynamic scheduler 303 grants desired cell rates to virtual channels 1001-4 to 1001-10, which each have a cell rate below the average per channel cell rate $$\left(\text{i.e.} \frac{\text{line rate}}{\text{number of virtual channels}}\right),$$

and divides the remainder cell rate with virtual channels 1001-1 to 1001-3, which each have a cell rate above the average per channel cell rate. FIG. 10 also shows that virtual channels 1001-1 to 1001-3 are "bottled-neck". As mentioned above, under the present invention, bottle-necked virtual channels are immediately returned to the ready list and virtual channels falling behind its CCR are rescheduled in a manner which compensates for its time $t_{deficit}$. Thus, the virtual channels having cell rates above the average per channel cell rate consume the bandwidth unused by those virtual channels with a cell rate below the average per channel cell rate. Further, since the ready list of ready queue 650 is a linked list, the unused bandwidth is shared among the virtual channels in ready queue 650 in a substantially "round-robin" fashion. Therefore, the bandwidth allocation under the present invention includes inherently a min-max fairness scheme.

Figure 11:
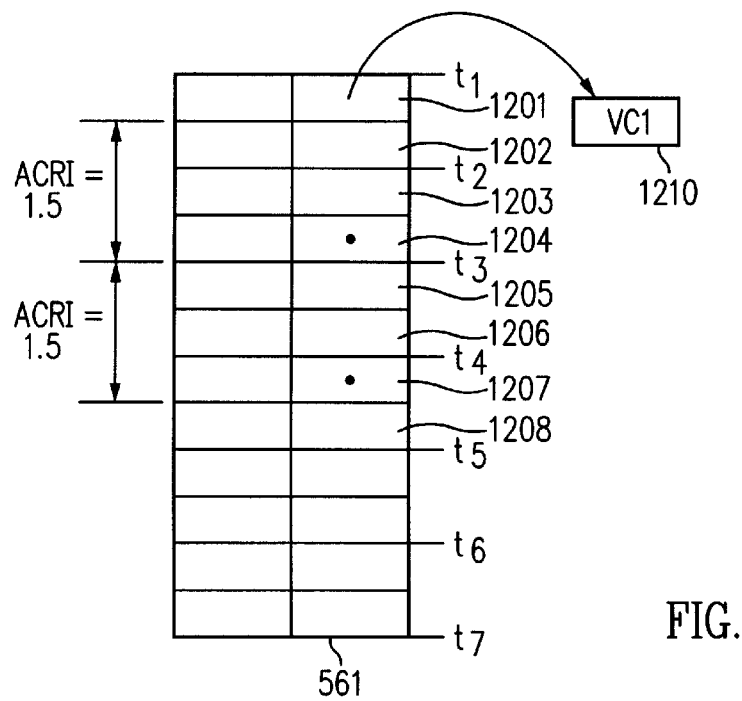
FIG. 11 illustrates an embodiment of the present invention in which events dynamic schedule table 561 is scheduled using a fractional "ACR inverse" (ACRI).

Dynamic scheduler 303 described above accesses one DST entry per ATM cell slot, and provides only a single integral ACR per virtual channel. However, under such arrangement, the highest cell rate (i.e. transmission scheduled for every DST entry) and the second highest cell rate (i.e. transmission scheduled for every other DST entry) available to a virtual channel differs by a factor of 2. That is, under the scheme described above, if the 155 mb/sec. data rate is not sustainable, the next available data rate is 77.5 mb/sec. Clearly, finer granularity in scheduling is desired to achieve the highest possible cell rate. In addition, the maximum size of DST 651 constrains the lowest cell rate dynamic scheduler 303 can support. To achieve finer granularity, more than one DST entry can be allocated for each ATM cell transmission time slot, so that an ACRI having a precision of a fractional ATM cell can be allocated. For example, if two DST entries are allocated for each transmission time slot, an ACRI having a precision of 0.5 ATM cell can be provided. This example is illustrated in FIG. 11. In FIG. 11, a portion of DST 651, spanning transmission time slots $t_1, t_2, \ldots, t_7$, is shown including DST entries 1201 to 1208. Virtual channel VC1 1210 is scheduled for transmission at time slot t1 at DST entry 1201. Assuming that an ATM cell is transmitted from virtual channel VC1 1210 at time slot $t_1$, virtual channel VC1 is rescheduled at DST entry 1204 and again at DST entry 1207. Thus, in the example of FIG. 11, virtual channel VC1 1210 is scheduled to transmit twice over three ATM cell time slots, yielding an effective cell rate of $$\frac{\text{line rate}}{1.5}.$$

By increasing the number of entries for each ATM cell transmission time slot, finer granularity in supported cell rates can be achieved. The same effect can be achieved without increasing the size of DST 561 if multiple ACRIs are assigned to each virtual channel. For example, if a single DST entry is examined for each ATM cell time slot, but two ACRIs, say 1 and 2, are alternately used to schedule a virtual channel, the effective cell rate of $$\frac{\text{line rate}}{1.5}$$

can also be achieved. Similarly, if an ACRI of 1 is used, except at every fourth scheduling operation, where an ACRI of 2 is used instead, an effective cell rate of $$\frac{\text{line rate}}{1.25}$$

can be achieved. As another example, a "dither" counter, e.g. a counter which counts in 4-state cycles, can be used to provide switching between ACRIs to create 0.25 ATM cell precisions. Such counter can be implemented, for example, as an additional field in the record of a current transmission list. In that implementation, the count field is updated every time an ATM cell transmission for the corresponding virtual channel is scheduled.

To schedule virtual channels having very slow rates, e.g. a virtual channel having a ACRI greater than the size of DST 651, a "skip" counter can be used. For example, if DST 651 includes 256 entries and one DST entry is read for each ATM cell time slot, a virtual channel with a ACRI of 1024 can be scheduled using a 4-state skip counter. Under this arrangement, except when the skip count is a designated one of the four possible count values (e.g. zero), the virtual channel is rescheduled, rather than removed to the ready list of ready queue 560, and the skip counter is updated. Transmission of an ATM cell occurs only when the designated count is reached.

A simulator of dynamic scheduler 303, implemented in accordance with the methods described above, is provided in Appendix A as an additional example of an embodiment of the present invention. The simulator of Appendix A, which is written in the industry standard "C" programming language, constitutes an integral part of the present disclosure.

The above detailed description is provided to illustrate specific embodiments of the present invention and is not intended to be limiting. Numerous modifications and variations within the scope of the present invention are possible. The present invention is defined by the following claims.

APPENDIX A

```c
/* ABR scheduler simulator */
#include <stdio.h>
#include <fcntl.h>
#include <math.h>
#define STSIZE 300 /* SRAM ST table - up to 1024 */
#define VCTAB 60 /* VC table */
#define BWADJ 1000 /* simulation only - how often (after how many VCTAB cells) to change CBR part */
#define DITHLIM 10
#define DIVISOR 1
#define DELTA 10
#define DEFLIMIT deflimit
struct st_s {
    short head;
    short tail;
    } st [STSIZE], *stp, *dst;
struct vc_s {
    short next; /* link */
    short def; /* deficit accumulator */
    short should; /* desired xmit time */
    short cp; /* Cp counter */
    short cp_s; /* Cp counter start */
    short idx; /* Index */
    short dith; /* how many to add */
    short dithc; /* state of dithering */
    } *vcpt, vc [VCTAB+1]; /* slot 0 not used ! */
struct vc_st {
    short cp_s; /* Cp counter start */
    short idx; /* Index */
    } vc_t[VCTAB];
short m_head = 0, m_tail = 0; /* transmit queue head & tail */
int gone, deflimit;
int m52realorig, m53orig, m11orig, m52orig, m52cur, m52tim, m52acc, m52cnt, aqcnt=0;
int bwinc, bwdiff, bwa, bwc, bwmin, bwmax, bwadj, bwconv;
/* examine the next slot and move to output queue, if something there */
sched( )
{
    /* enqueue from st to xq */
    int current, new, t, i, di, t_cp;
    /* @@@@ fprintf(stderr, "\nSTART:\n"); */
    if(stp→head) { /* non-empty */
    /* @@@@ fprintf(stderr, "%d→head = %hd\n", stp - st, stp→head); */
    /* @@@ */ if(vc[m_tail].next != 0) fprintf(stderr, "C:vc[%d].next = %d !\n", m_tail, vc[m_tail].next);
    /* @@@@ fprintf(stderr, "Queue: "); for(di=stp→head; di != 0; di = vc[di].next) fprintf(stderr, "%d,", di); fprintf(stderr, "\n"); */
    /* @@@@ fprintf(stderr, "After: "); for(di=m_head; di != 0; di = vc[di].next) fprintf(stderr, "%d,", di); fprintf(stderr, "\n"); */
        vc[m_tail].next = stp→head;
    /* @@@@ fprintf(stderr, "stp→head = %hd\n", stp→head); */
        m_tail = stp→tail;
    /* @@@ */ if(vc[m_tail].next != 0) fprintf(stderr, "D:vc[%d].next = %d !\n", m_tail, vc[m_tail].next);
        stp→head = stp→tail = 0;
    /* @@@@ fprintf(stderr, "Result: "); for(di=m_head; di != 0; di = vc[di].next) fprintf(stderr, "%d,", di); fprintf(stderr, "\n"); */
        }
    else { /* empty */
    /* @@@@ fprintf(stderr, "%d→head empty\n", stp - st); */
    /*    ??? */
        }
    t = stp - st; /* time now */
    /* @@@@ fprintf(stderr, "TIME (slot): %d\n", t); */
    stp++;
    if(stp >= st + STSIZE) stp = st;
    /* dequeue from xq */
    { int w = t - m52tim;
    if(w < 0) w += STSIZE;
    if(w == vc[52].cp) {
        m52tim = t;
        printvect(52);
        return;
        }
    }
    current = m_head;
    if(vc[current].dithc < 0) {
        if(vc[current].dith < -vc[current].dithc) { /* send */
            vc[current].dith++;
            }
```

APPENDIX A-continued

```
            else { /* do NOT send */
                vc[current].dith++;
                if(vc[current].dith == 4 * DITHLIM) vc[current].dith = 0;
                /* spool again and fetch next */
                new = t + vc[current].cp;
                if(new > STSIZE - 1) new -= STSIZE;
                vc[current].def = 0;
                vc[current].should = new;
                vc[current].next = 0;
                if(st[new].head) { /*something there */
    /* @@@ */ if(vc[st[new].tail].next != 0) fprintf(stderr, "A:vc[%d].next = %d !\n",
st[new].tail, vc[st[new].tail].next);
                    vc[st[new].tail].next = current;
                    st[new].tail = current;
                }
                else { /* was empty */
                    st[new].tail = st[new].head = current;
                }
                m_head = vc[m_head].next;
                if(m_head == 0) m_tail = 0;
                current = m_head;
            }
        }
        if(current) {
            printvect(current);
            gone++;
            if(t != vc[m_head].should) {
                int y = t - vc[m_head].should;
                if(y < 0) y += STSIZE;
                vc[m_head].def += y;
                if(vc[m_head].def > DEFLIMIT) {
#if 0
                    fprintf(stderr, "\n\n\nProblem with VC %d (cp = %d): def =
%d\n\n\n", m_head, vc[m_head].cp, vc[m_head].def);
                    exit(1);
#endif
                    vc[m_head].def = DEFLIMIT;
                }
            }
    /* @@@@ fprintf(stderr, "Dequeue %d. Should go at %hd. Def = %hd, Cp = %hd\n",
current, vc[m_head].should, vc[m_head].def, vc[m_head].cp); */
        }
        else printvect(0);
        m_head = vc[m_head].next;
    /* @@@@ fprintf(stderr, "Next is %d\n", m_head); */
        if(m_head == 0) m_tail = 0:
        vc[current].next = 0;
        if(!current) return;
        /* schedule again */
        t_cp = vc[current].cp;
        if(vc[current].dithc > 0) {
            if(vc[current].dith < vc[current].dithc) { /* send higher */
                vc[current].dith++;
                t_cp++;
            }
            else if(vc[current].dith < DITHLIM) {
                vc[current].dith++;
                if(vc[current].dith == DITHLIM) vc[current].dith = 0;
            }
        }
        i = t_cp - vc[current].def;
#if 1
        if(i < 1) {
            vc[current].def = 1 - i;
            i = 1;
        }
        else vc[current].def = 0;
#endif
#if 0
        if(i < 1 + vc[current].cp / 2) {
            vc[current].def = 1 + vc[current].cp / 2 - i;
            i = 1 + vc[current].cp / 2;
        }
        else vc[current].def = 0;
#endif
        new = t + i;
        if(new > STSIZE - 1) new -= STSIZE;
        vc[current].should = new;
    /* @@@@ fprintf(stderr, "Schedule again at %d. Deficit is %hd\n", new, vc[current].def);
```

APPENDIX A-continued

```
*/
    if(st[new].head) { /*something there */
    /* @@@ */ if(vc[st[new].tail].next != 0) fprintf(stderr, "A:vc[%d].next = %d !\n",
st[new].tail, vc[st[new].tail].next);
    /* @@@@ fprintf(stderr, "Add after: "); for(di=st[new].head; di != 0; di = vc[di].next)
fprintf(stderr, "%d,", di); fprintf(stderr, "\n"); */
        vc[st[new].tail].next = current;
        st[new].tail = current;
    /* @@@@ fprintf(stderr, "Result: "); for(di=st[new].head; di != 0; di = vc[di].next)
fprintf(stderr, "%d, ", di); fprintf(stderr, "\n"); */
        }
    else { /* was empty */
        st[new].tail = st[new].head = current;
    /* @@@@ fprintf(stderr, "Slot was empty\n"); */
        }
    /* @@@ */ if(vc[current].next != 0) fprintf(stderr, "B.vc[%d].next = %d !\n", current,
vc[current].next);
}
main(int argc, char *argv[ ])
{
    bwadj = 0;
    filltabs( );
    m11orig = vc[11].cp;
    m52realorig = m52orig = vc[52].cp;
    m53orig = vc[53].cp;
    m52cur = m52orig * 10;
    deflimit = 16;
    if(argc > 1) deflimit = strtol(argv[1], 0, 0);
    stp = st;
    while(1) {
        int i, j, k;
        k = i = 0;
        for(gone=0; gone < VCTAB;) {sched( );i++;}
        for(j=0; j < STSIZE; j++) if(st[j].head)k++;
        k = (k * 100) / STSIZE;
        fprint(stderr, "\033[1;1H %3d%% - %d:%d (%3d%%) \n", k, gone, i, (gone * 100)
\i);
        mod11( );
        if(argc > 1) continue;
        if(bwc < bwa) { /* simulate CBR for metering purposes */
            int j, i = (bwa – bwc) * 100 / bwa;
            i = (VCTAB * i) / (100 – i);
            for(j=0; j < i; j++)printf(" -1,");
            printf("\n");
            }
        bwadjust( ); /* modify available ABR bandwidth for simulation */
        }
}
int m11=0;
int m11m = 10, m11dir = -1;
mod11( )
{
    if(m11++ < 500) return;
    m11 = 0;
    vc[52].cp = vc[52].cp_s = m52orig = (m52realorig * m11m) / 10;
    if(vc[52].cp < 2) {
        vc[52].cp = vc[52].cp_s = m52orig = 2;
        }
    m11m += m11dir;
    if(vc[52].cp < 3) m11dir = 1;
    if(m11m > 20) m11dir = -1;
}
/*
mod11( )
{
    if(m11++ < 1000) return;
    m11 = 0;
    vc[11].cp = vc[11].cp_s = (m11orig * m11m) / 10;
    vc[53].cp = vc[53].cp_s = (m53orig * m11m) / 10;
    m11m += m11dir;
    if(m11m < 1)m11dir = 1;
    if(m11m > 10)m11dir = -1;
}
*/
/* initial setup */
filltabs( )
{
    int val, c, norm = 0, ditt, scnt;
    char combuf[100];
```

APPENDIX A-continued

```
    double f1, f2;
    FILE *inp = fopen("cp.dat", "r");
    if(inp == (FILE*)NULL) {
        perror("pars.dat cannot be opened");
        exit(1);
    }
    bwa = 0; /* total ABR bandwith */
    c = 0, val = 0;
    while(fgets(combuf, sizeof(combuf), inp) != NULL && c++ < VCTAB) {
        if((scnt=sscanf(combuf, "%d %d", &val, &ditt)) < 1) break;
        if(val <= 0) {
            fprintf(stderr, "Error at line %d\n", c-1);
            exit(1);
        }
        norm += (1000000 / val);
        vc[c].next = vc[c].def = vc[c].should = 0;
        vc[c].cp_s = vc[c].cp = val;
        /* @@@ */ if(vc[c].cp_s > STSIZE-1) fprintf(stderr, "\ncp_s problem at %d\n",
__LINE__);
        vc[c].dithc = vc[c].dith = 0;
        if(scnt == 2) {
            if(ditt == 0 || ditt >= DITHLIM || ditt <= -4 * DITHLIM) {
                fprintf(stderr, "D Error at line %d(v: %d)\n", c, ditt);
                exit(1);
            }
            vc[c].dithc = ditt;
        }
        vc[c].idx = c;
    }
    f1 = (double)norm / 1000000.;
    fprintf(stderr, "\nSum factor: %g \n", f1);
    sleep(2);
    for(c = 1; c <= VCTAB; c++) {
        if(vc[c].cp >= STSIZE) {
            fprintf(stderr, "Problem VC[%d] = %d\n", c, vc[c].cp);
            exit(1);
        }
        bwa += 155000 / vc[c].cp; /* values are expected to be in, say, 0.273 uS units. */
    }
    if(c < VCTAB) {
        fprintf(stderr, "Only %d values for %d CPs\n", c, VCTAB);
        exit(1);
    }
    fclose(inp);
    if(VCTAB > STSIZE) {
        fprintf(stderr, "Schedule table smaller than VC table\n");
        exit(1);
    }
    for(c=1; c <= VCTAB; c++) if(c != 52) st[c].head = st[c].tail = c;
    /* for bandwidth modulation purposes */
    bwc = bwa;
    bwmin = bwa/10; bwmax = bwa + bwa / 5;
    bwinc = bwa / 10;
    srandom(time(NULL));
}
int pret = 0;
printvect(v)
int v;
{
    printf("%03d,", v);
    if(pret++ > 32) {pret = 0; printf("\n");}
}
int csgn = -1;
bwchange( )
{
    bwc = bwc + bwinc * csgn;
    if(bwc < bwmin) {
        bwc = bwmin;
        csgn = 1;
    }
    if(bwc > bwmax) {
        bwc = bwmax;
        csgn = -1;
    }
}
cfun(struct vc_st *a, struct vc_st *b)
{
    if(a->cp_s > b->cp_s) return(-1);
    if(a->cp_s < b->cp_s) return(1);
```

APPENDIX A-continued

```
            else return(0);
}
bwadjust( )
{
        int i, j, dvar, D, afrom = -1;
        int p, q;
        if(bwadj++ < BWADJ) return;
        bwadj = 0;
        bwchange( );
        p = bwc * 100 / bwa;
        q = 100 - p;
        /* display ABR bandwidth bar */
        fprintf(stderr, "\033[1;1H");
        when(p--) fprintf(stderr, "@");
        while(q-- > 0) fprintf(stderr, "-");
        fprintf(stderr, "\033[K\n");
        /* max-min logic - as on page 38 */
        for(i=1; i <= VCTAB; i++) {
                vc[i].cp = vc[i].cp_s;
                vc[i].dithc = vc[i].dith = 0;
                if(vc[i].cp < DELTA) { /* must dither */
                        double l, h, cu, delta;
                        int step;
                        l = vc[i].cp * DIVISOR;
                        h = DIVISOR;
                        cu = l / h;
                        l = floor(cu);
                        step = (cu - l) * h;
                        if(step >= DIVISOR || step < 0) { fprintf(stderr, "Terrible! %d \n",
step); exit(1);}
                        if(step > 0) { /* really must dither */
                                vc[i].dithc = step;
                        }
                }
        }
        if(bwc < bwa) {
                bwdiff = bwa - bwc;
                /* sort by start */
                for(i=0, vcpt = vc, vcpt++; vcpt <= vc + VCTAB; vcpt++, i++) {
                        vc_t[i].cp_s = vcpt->cp_s;
                        /* @@@ */ if(vc_t[i].cp_s > STSIZE-1)
                        /* @@@ */    fprintf(stderr, "\ncp_s problem at %d\n", __LINE__);
                        vc_t[i].idx = i+1;
                }
                qsort(vc_t, VCTAB, sizeof(struct vc_st), cfun);
                for(i=VCTAB-1; i >= 0; i--) {
                        dvar = 0;
                        for(j=VCTAB-1; j >=i; j--) {
                                dvar += 155000/vc_t[j].cp_s;
                        }
                        if(i == 0) {
                                afrom = 0;
                                D = (dvar - bwdiff) / VCTAB;
                                break;
                        }
                        if(dvar < bwdiff) continue;
                        dvar = dvar - bwdiff;
                        D = dvar / (VCTAB - i);
                        if(D < 155000 / vc_t[i-1].cp_s) continue;
                        afrom = i;
                        break;
                }
                /* adjust */
                D = 155000 / D;
                if(D > STSIZE - 1) {
                        if(i != 0) {
                                fprintf(stderr, "max-min problem at %d\n", __LINE__);
                                exit(1);
                        }
                        D = STSIZE - 1; /* can't get any slower */
                }
                for(i=VCTAB-1; i >= afrom; i--) {
                        vc[vc_t[i].idx].cp = D;
                        /* @@@ */ if(vc[vc_t[i].idx].cp > STSIZE-1)
                        /* @@@ */    fprintf(stderr, "\ncp problem at %d\n", __LINE__);
                        vc[vc_t[i].idx].dithc = vc[vc_t[i].idx].dith = 0;
                        if(vc[vc_t[i].idx].cp < DELTA) { /* must dither */
                                double l, h, cu, delta;
                                int step;
```

APPENDIX A-continued

```
                l = vc[vc_t[i].idx].cp * DIVISOR;
                h = DIVISOR;
                cu = l / h;
                l = floor(cu);
                step = (cu - l) * h;
                if(step >= DIVISOR || step < 0) { fprintf(stderr, "Terrible! %d
\n", step); exit(1);}
                if(step > 0) { /* really must dither */
                    vc[vc_t[i].idx].dithc = step;
                    }
                }
            }
        }
    /* signal reset to the display program */
    printf("-2,\n");
}
```

We claim:

1. A method for scheduling data transmission for a plurality of data channels, comprising the steps of:

providing a schedule table, said schedule table holding a plurality of entries, each entry of said schedule table being associated with a time slot for data transmission and holding zero or more records of a first type, each record of said first type referencing a data channel having data to be transmitted at said associated time slot;

providing a ready queue, said ready queue holding zero or more records of a second type each referencing a data channel having data to be transmitted;

at each time slot, (i) removing, from each entry associated with said time slot, any and all said records of said first type, and (ii) including in said ready queue said removed records of said first type as said records of said second type; and whenever data is transmitted, (i) removing, from said ready queue, a record of said second type; (ii) transmitting data from the data channel referenced in said removed record of said second type; (iii) selecting an entry of said schedule table; and (iv) including in said selected entry of said schedule table said removed record of said second type.

2. A method as in claim 1, wherein each data channel is associated with a transmission time interval representing the number of elapsed time slots between transmissions, said step of selecting an entry of said schedule table selects an entry associated with the time slot which is offset from the time slot at which said transmitting step took place by said transmission time interval.

3. A method as in claim 1, wherein each data channel is associated with a transmission time interval representing the number of elapsed time slots between transmissions and said record of said second type includes a count representing the time slot at which said record of said second type is included in said ready queue, said step of selecting an entry of said schedule table comprises selecting an entry of said schedule table associated with the time slot which is offset from the time slot at which said transmitting step took place by said transmission time interval, less a difference in elapsed time slots between said count and said time slot at which said transmitting step took place and said count.

4. A method as in claim 3, wherein if said difference is greater than said transmission time interval, said step of selecting selects an entry associated with the time slot immediately following said time slot at which said transmitting step took place.

5. A method as in claim 1, wherein said schedule table allocates a single entry to each time slot.

6. A method as in claim 2, wherein said schedule table allocates a plurality of entries to each time slot, wherein each entry represents, for scheduling purpose, a predetermined fraction of said time slot, and wherein said transmission time interval being expressed in units capable of designating said predetermined fraction of said time slot.

7. A method as in claim 3, wherein said schedule table allocates a plurality of entries to each time slot, wherein each entry represents, for scheduling purpose, a predetermined fraction of said time slot, and wherein said transmission time interval being expressed in units capable of designating said predetermined fraction of said time slot.

8. A method as in claim 2, further comprising, prior to each instance of performing said step of selecting an entry from said schedule table, the step of selecting, from a plurality of predetermined values, a value for said transmission time interval, said step of selecting a value selects said plurality of predetermined values according to a predetermined sequence.

9. A method as in claim 3, further comprising, prior to each instance of performing said step of selecting an entry from said schedule table, the step of selecting, from a plurality of predetermined values, a value for said transmission time interval, said step of selecting a value selects said plurality of predetermined values according to a predetermined sequence.

10. A method as in claim 1, wherein said records of said second type in said ready queue are maintained in an ordered linked list having a first end and a second end, and wherein said step of removing a record of said second type removes said record from said first end of said ordered linked list.

11. A method as in claim 1, wherein said records of said second type in said ready queue are maintained in an ordered linked list having a first end and a second end, and wherein said step of including in said ready queue said removed records of first type includes said record at said second end of said ordered linked list.

12. A method as in claim 1, wherein said step of including in said ready queue said removed record associates in said removed record a skip count, and wherein said step of transmitting data comprises the steps of:

updating said skip count; and transmitting said data only when said skip count reaches a predetermined value.

* * * * *